Aug 5, 1941.  C. M. YODER  2,251,313
MACHINE FOR TRIMMING OR SLITTING SHEET MATERIAL
Filed Feb. 10, 1940  3 Sheets-Sheet 3
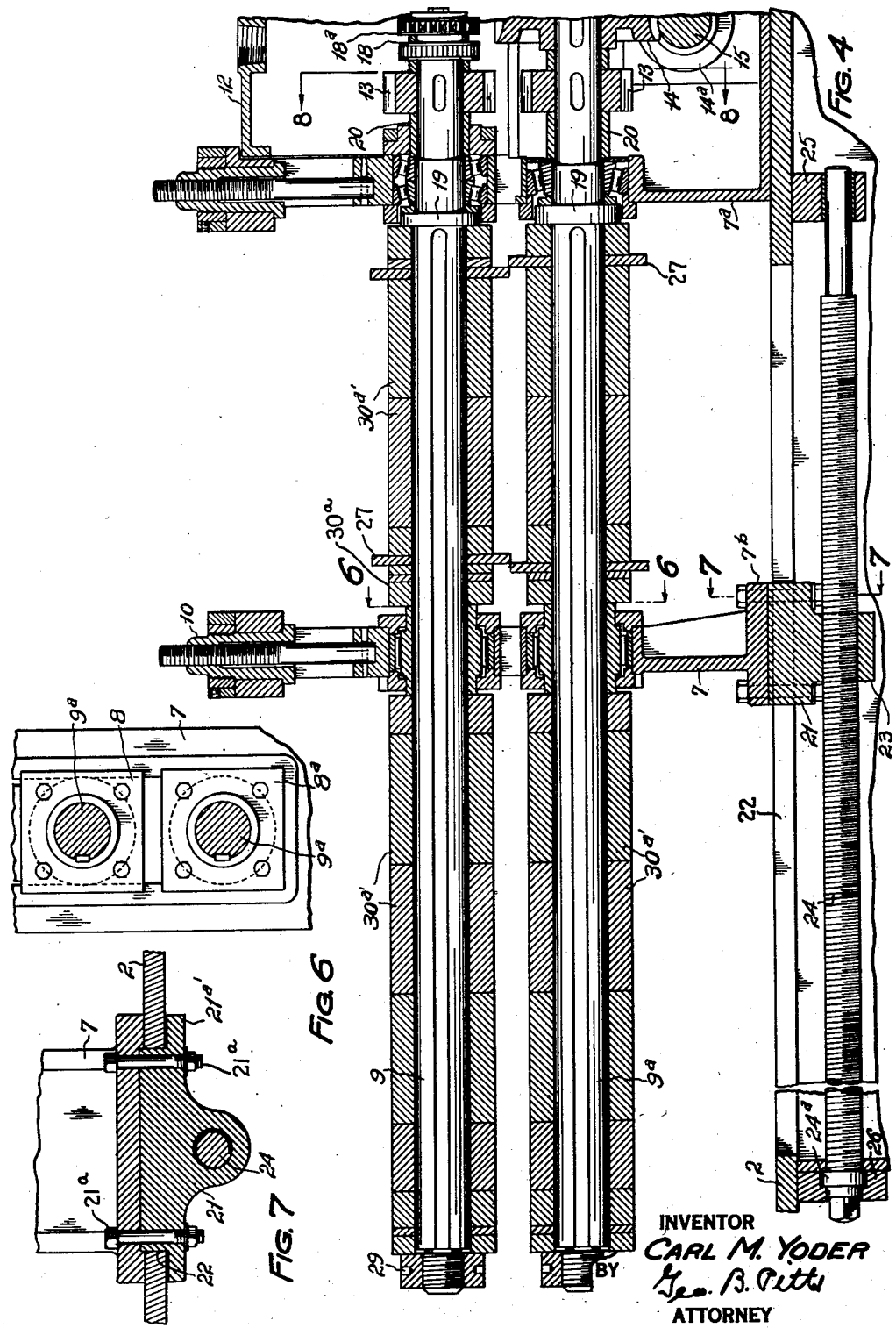
INVENTOR
CARL M. YODER
Geo. B. Pitts
ATTORNEY Patented Aug. 5, 1941

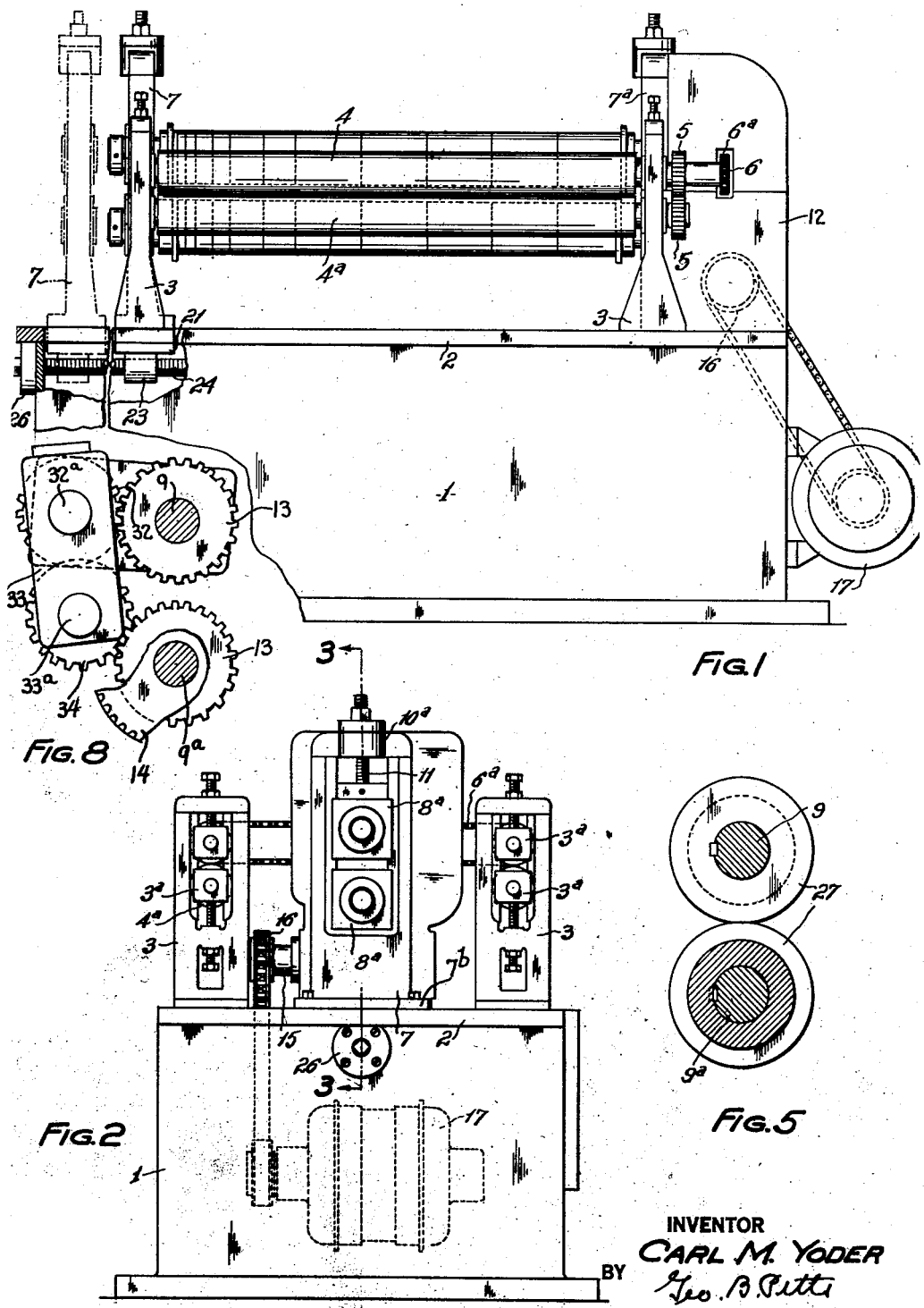

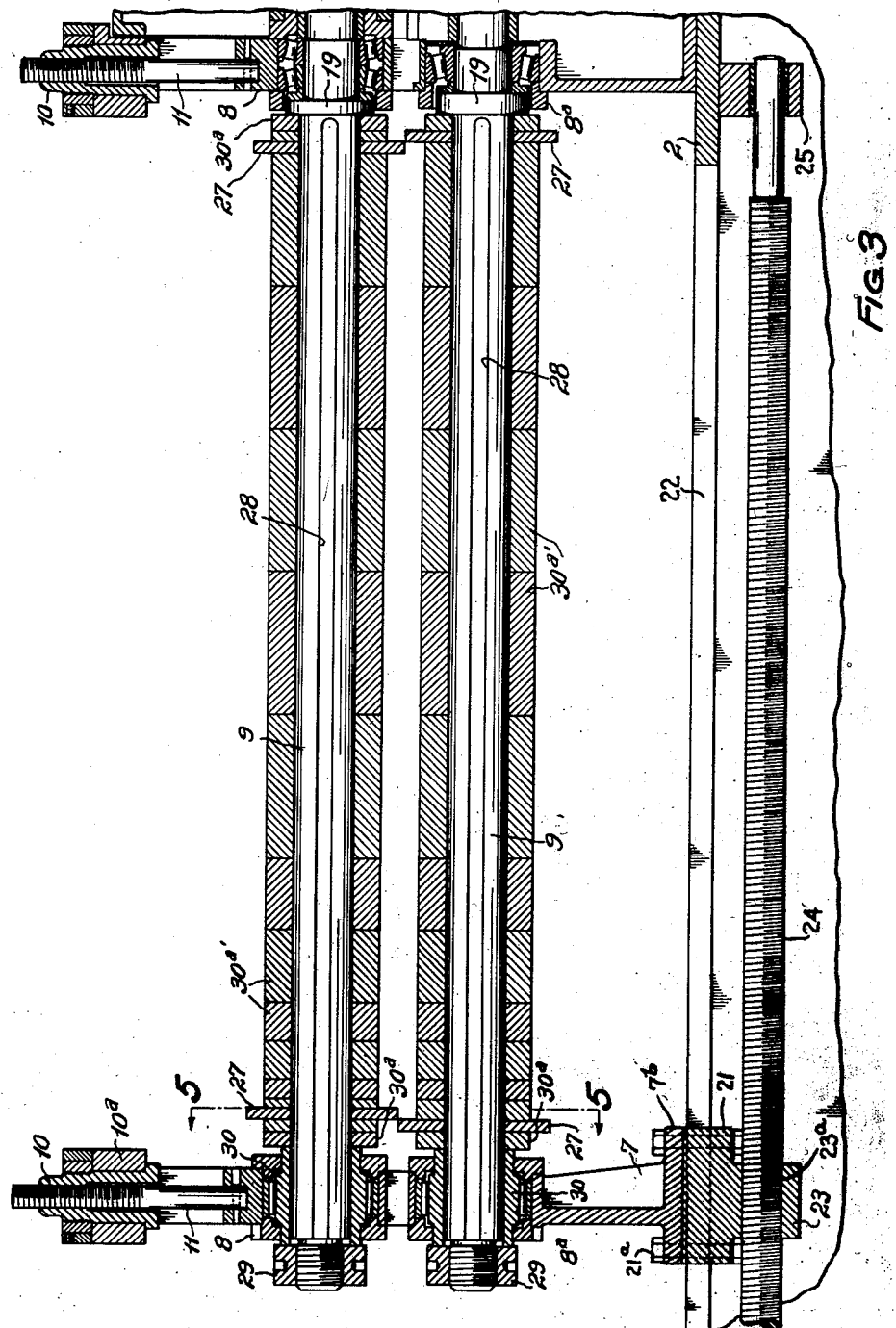

2,251,313

UNITED STATES PATENT OFFICE 2,251,313

MACHINE FOR TRIMMING OR SLITTING SHEET MATERIAL

Carl M. Yoder, Lakewood, Ohio

Application February 10, 1940, Serial No. 318,342

3 Claims. (Cl. 164—60)

This invention relates to a machine for trimming and/or slitting sheet material of various kinds, more particularly it is adapted for operation on sheet metal. The machine is arranged to trim and/or slit sheet metal that is of a maximum predetermined width. It often becomes necessary in a plant using a machine of the type referred to, to trim and/or slit relatively thick sheet metal, of less width, so that unless the machine is provided with back-up rolls for the rolls carrying the trimming or slitting devices, or the plant is equipped with a separate machine capable of trimming or slitting relatively thick sheets, these thicker sheets cannot be trimmed or slitted.

One object of the invention is to provide an improved machine of this character capable of trimming and/or slitting relatively wide sheet material and also trimming and/or slitting various widths of sheet material of greater thickness in a ready manner, so that one machine may be utilized for both purposes.

Another object of the invention is to provide an improved machine of this character capable of trimming and/or slitting sheet material of various widths with minimum disassembly and re-assembly of parts of the machine.

Other objects of the invention will be apparent to those skilled in the art to which my invention relates from the following description taken in connection with the accompanying drawings, wherein—

Fig. 1 is a front elevation of a machine embodying my invention.

Fig. 2 is a side elevation.

Fig. 3 is a fragmentary section on the line 3—3 of Fig. 2.

Fig. 4 is a view similar to Fig. 3, but showing the parts thereof adjusted for trimming a sheet of material of reduced width.

Fig. 5 is a fragmentary section on the line 5—5 of Fig. 3.

Fig. 6 is a fragmentary section on the line 6—6 of Fig. 4.

Fig. 7 is a section on the line 7—7 of Fig. 4.

Fig. 8 is a section on the line 8—8 of Fig. 4.

In the drawings, 1 indicates as an entirety a suitable support forming a bed 2, on which are mounted front and rear pairs of housings 3. Each pair of housings 3 is shaped to adjustably support bearing boxes 3a for the shafts of upper and lower pinch rolls 4, 4a, the rolls being fixed to the shafts in any desired manner. The inner ends of the roll shafts (that is, the ends at the right as viewed in Fig. 1), project beyond the adjacent housing 3 and are provided with gears 5, in meshing relation, whereby one is driven by the other at the same speed, the upper roll shaft being extended and provided with a sprocket 6, which is driven by a chain 6a as later set forth.

7, 7a, indicate a pair of outer and inner housings mounted on the bed 2 intermediate the pairs of housings 3 and each shaped to support a pair of bearing boxes 8, 8a, for upper and lower shafts 9, 9a. The boxes 8 for the upper shaft 9 are adjustable toward and from the boxes 8a, preferably by means of nuts 10, mounted in cross members 10a and engaging the threaded portions of rods 11, each of which is connected at its lower end to the adjacent box 8. The housing 7a is fixed to the bed 2 in any desired manner and shaped to provide a casing 12 into which the adjacent or inner ends of the shafts 9, 9a, project. The shafts 9, 9a, are provided within the casing 12 with gears 13, which may be of a size to mesh whereby one is driven by the other at the same speed, but preferably the gears are drivingly connected as later set forth. The shaft 9a outwardly of the gears 13 is provided with a worm gear 14 in mesh with a worm 14a which is fixed to a shaft 15 suitably mounted in the walls of the casing 12, the shaft 15 in turn being provided with a sprocket 16 driven by an endless chain from the shaft of a motor 17. The shaft 9 outwardly of the gears 13 is provided with sprockets 18, 18a, one thereof being engaged by one of the chains 6a to drive the adjacent pair of pinch roll shafts and the other being engaged by the other chain 6a to drive the adjacent pair of pinch roll shafts. The sets of bearings in the bearing boxes 8, 8a, for the inner ends of the shafts 9, 9a, are preferably of the anti-friction roller type, each set abutting on its inner side a collar 19 fixed to the adjacent shaft and on its outer side a spacer 20 which is in engagement with the adjacent gear 13.

The housing 7 is provided with a base portion 7b which slidably engages the bed 2 at opposite sides of a slot 22 formed in the bed 2. The base portion 7b is connected to a shoe 21 by a plurality of bolts 21a. The shoe 21 engages the side walls of the slot 22 and is provided at its opposite sides with flanges 21a which engage the lower side of the bed 2 at opposite sides of the slot 22, to maintain the housing in position on the bed and permit it to slide thereon transversely. The shoe 21 is provided with a depending lug 23, which is formed with a through opening 23a suitably threaded to engage a screw 24. The screw 24 is rotatably mounted at its inner end in a bearing provided in a block 25, suitably fixed to the lower side of the bed 2. The outer end portion of the screw projects through the side wall of the support 1 and is provided with an annular shoulder 24a which engages the outer face of the side wall and rotatably fits a recess formed in a plate 26 suitably secured to the outer face of the side wall, the walls of the recess and side wall serving to hold the screw 24 against axial movement when it is rotated. The outer end of the screw 24 is shaped to take a suitable tool, whereby the screw may be rotated, which operation serves to move the housing 7 in one or the other direction transversely of the bed 2 according to the direction of rotation of the screw, for purposes later set forth. As shown in Figs. 1 and 4, the bed 2 extends laterally beyond the outer ends of the shafts 9, 9a, so that the housing 7 may be moved or adjusted to an abnormal position, as shown in dotted lines in Fig. 1, when assemblies or disassemblies are to be made.

27 indicates sets of cutting devices, each device being keyed to the adjacent shaft, as shown in Fig. 5, the spline 28 in each shaft extending from its outer end to a point adjacent the collar 19, whereby each device may be positioned on the shaft in any desired position and driven thereby. The outer end of each shaft 9, 9a, is provided with screw threads to take a nut 29, which, when tightened against spacers 30, 30a, 30a' (the latter spacers 30a, 30a', being removable) arranged between it and the adjacent trimming device 27 and between the devices 27 and between the remote device 27 and the collar 19, operates to clamp these parts in fixed relation. The spacers 30a may be of sectional construction but preferably are of annular shape and slidably fit each shaft and may be removed endwise thereof, whereas each spacer 30 (which also slidably fits the adjacent shaft) forms the inner race for the anti-friction roller bearing for the outer end of the shaft. As shown in Fig. 3, each spacer 30 extends beyond the opposite sides of the adjacent bearing box 8 or 8a so as to be engaged by the nut 29 and clamped against the adjacent spacer 30a.

As shown in Figs. 1 and 3, the bed 2 and shafts 9, 9a, are constructed to trim sheet material of a predetermined width and thickness. Where the sheet material is of less width, one or more of the spacers 30a' are transferred from their position between the sets of trimming devices 27 (see Fig. 3) to the position between the spacer 30 and the nut 29 (see Fig. 4), the number of spacers so transferred or re-positioned being dependent upon the length of the adjustment of the housing 7 toward the housing 7a, as already set forth. In making such transfer of the spacers 30a', the nuts 29 are removed from the shafts 9, 9a, next the housing 7 is moved to its abnormal position, and then the spacers 30a, the adjacent trimming devices 27 and the necessary number of spacers 30a' are removed. Thereafter the set of trimming devices and spacers 30a are replaced and the housing 7 moved into position and adjusted to effect engagement of the spacers 30 with the spacers 30a; and finally the removed spacers 30a' are replaced on the shafts outwardly of the spacers 30 and the nuts 29 applied and tightened to clamp these parts together and against the collars 19, as shown in Fig. 4.

The driving connection between the gears 13, 13, is of a character to compensate for adjustment of the shaft 9 and consists of the following: the gear 13 of the upper shaft 9 meshes with a gear 32 mounted on a shaft 32a. The shaft 32a has bearing in the side members of a yoke 33 which is swingable about a shaft 33a, the latter being mounted in the side walls of the casing 12. A link 33' formed with openings so as to rotatably fit over the shaft 9 and shaft 32a serves to maintain the gears 13 and 32 in meshing relation and prevents the upper end of the yoke 33 from swinging outwardly. The shaft 33a supports a gear 34 in mesh with the gear 13 which is fixed to the shaft 9a. In this arrangement the shaft 9a drives the shaft 9, the gears forming the driving connection having a ratio that drives the shaft 9 at the same speed as the shaft 9a.

It will be noted that the machine herein illustrated is constructed to meet certain specified conditions as to the width and thickness, as well as density of the material to be treated, but since the shafts carrying the trimming devices are not provided with back-up rolls, the machine is not adapted to operate on thicker material. However, in plants equipped with machines of this capacity and size, occasions often arise to trim off sheet metal of less width and greater thickness. My construction lends itself to such occasions, since one housing, the housing 7, may be adjusted relative to the housing 7a, to support the shafts 9, 9a, with the sets of trimming devices spaced to meet this condition, without imparting undue strains on the shafts and their bearings. It will thus be seen that the machine has a dual capacity, to meet various requirements, without necessitating the installation of a separate or special machine.

It will be understood that in making a reassembly of the parts and adjustment of the housing 7, the spacers 30a' may be interchanged, one relative to the other on each shaft 9, 9a, or other spacers 30a' substituted for one or more thereof to provide the desired spacing of the sets of trimming devices; furthermore, where minute adjustment of each set of trimming devices or either thereof is found necessary, shims may be inserted between each device and one of the adjacent spacers.

It will be noted that the shafts 9, 9a, may be provided with a set of trimming devices in any desired position relative thereto and also with a set of slitting elements for slitting the material into sections.

It will also be noted that in my construction, the inner race of each bearing for the outer ends of the shafts is utilized as a spacer to simplify the construction.

To those skilled in the art to which my invention relates, many changes in construction and widely differing embodiments and applications thereof will suggest themselves without departing from the spirit and scope of the invention. My disclosures and description herein are purely illustrative and not intended to be in any sense limiting.

What I claim is:

1. In a machine of the class described, the combination with a supporting member, of a housing, one of which is provided with bearings and fixed to said member, upper and lower shafts mounted in and extending through said bearings, means connected to the extended ends of said shafts for driving them, a separate housing having bearings and normally arranged on said member to support the opposite ends of said shafts, said member having transversely disposed guides extending from a point adjacent said fixed housing toward and beyond the normal position of said separate housing and said separate housing having a shoe slidably engaging said guides, whereby said separate housing may be adjusted on said member to positions intermediate the ends of said shafts, said shafts extending through said last mentioned housing, collars on said shafts adjacent to said fixed housing, trimming devices removably mounted on said shafts, clamping devices engaging the outer ends of said shafts, and removable spacers on each shaft in end to end relation between the adjacent collar and the adjacent trimming device and between the latter and said adjacent clamping device arranged to secure said trimming device in position when said clamping device is operated into clamping position.

2. In a machine of the class described, the combination with a supporting member, of a housing fixed to said member and provided with upper and lower bearings each having inner and outer bearing elements, upper and lower shafts mounted in and extending through said bearings, means connected to the extended ends of said shafts outwardly of said fixed housing for driving them, a separate housing having upper and lower bearings each consisting of inner and outer elements through which said shafts extend, said separate housing being normally arranged on said member to support the opposite ends of said shafts and said member having transversely arranged guides extending from a point adjacent said fixed housing toward and beyond the normal position of said separate housing and said latter housing having a shoe slidably engaging said guides, whereby said separate housing may be adjusted on said member positions intermediate the ends of said shafts, collars on said shafts adjacent to said fixed housing, trimming devices removably mounted on said shafts, clamping devices engaging the outer ends of said shafts, removable spacers on each shaft in end to end relation between the adjacent collar and the adjacent trimming device, and removable spacers on each shaft, one of which consists of the inner bearing element for said adjacent shaft, in end to end relation, between the said adjacent trimming device and said adjacent clamping device arranged to secure said trimming device in position when said clamping device is operated into clamping position.

3. In a machine of the class described, the combination with a supporting member, of a housing fixedly mounted on said member and provided with upper and lower bearings, upper and lower shafts mounted in and extending through said bearings, means connected to the extended end portions of said shafts outwardly of said housing for driving them, a separate housing having upper and lower sets of anti-friction bearings through which said shafts extend, the inner race of the set of anti-friction bearings for each shaft being slidable on the adjacent shaft, said separate housing being normally arranged on said member to support the opposite ends of said shafts and said member having transversely arranged guides extending from a point adjacent said fixed housing toward and beyond the normal position of said separate housing and said latter housing having a shoe slidably engaging said guides, whereby said separate housing may be adjusted on said member to positions intermediate the ends of said shafts, a set of trimming devices slidable on and drivingly related to said shafts, and means for securing said devices in a predetermined position on said shafts, said means including removable spacers on each shaft between the trimming device and the bearings in said fixed housing, separate spacers on each shaft between the inner end of the inner race of the adjacent bearing and said device and a nut on the outer end of said shaft engaging the outer end of said inner race, said removable spacers being arranged to be mounted between said nut and said inner race when said separate housing is adjusted on said member.

CARL M. YODER.

CERTIFICATE OF CORRECTION.

Patent No. 2,251,313. August 5, 1941.

CARL M. YODER.

It is hereby certified that error appears in the printed specification of the above numbered patent requiring correction as follows: Page 2, second column, line 68, claim 1, strike out the comma and words ", one of which is"; page 3, first column, line 38, claim 2, after "member" insert --to--; and that the said Letters Patent should be read with this correction therein that the same may conform to the record of the case in the Patent Office.

Signed and sealed this 16th day of September, A. D. 1941.

(Seal)

Henry Van Arsdale,
Acting Commissioner of Patents.